United States Patent [19]
Kawahara

[11] Patent Number: 5,859,672
[45] Date of Patent: *Jan. 12, 1999

[54] IMAGE MOTION DETECTION DEVICE

[75] Inventor: Kenji Kawahara, Nara, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 732,883

[22] Filed: Oct. 16, 1996

[30] Foreign Application Priority Data

Mar. 18, 1996 [JP] Japan ................................ 8-061537

[51] Int. Cl.$^6$ ........................................................ H04N 7/24
[52] U.S. Cl. ................................................ 348/699; 348/420
[58] Field of Search ........................................ 348/384, 390, 348/400–403, 407, 409–413, 415, 416, 699, 700, 420; 382/232, 236, 238; H04N 7/137

[56] References Cited

U.S. PATENT DOCUMENTS

| | | | |
|---|---|---|---|
| 4,937,666 | 6/1990 | Yang | 348/413 |
| 5,488,419 | 1/1996 | Hui et al. | 348/402 |
| 5,510,856 | 4/1996 | Jung | 348/699 |
| 5,539,469 | 7/1996 | Jung | 348/413 |
| 5,587,741 | 12/1996 | Kim | 348/416 |

FOREIGN PATENT DOCUMENTS 7177519  7/1995  Japan .

*Primary Examiner*—Richard Lee

[57] ABSTRACT

An image motion detection device includes: a first motion detection section for generating a first motion vector by performing a first motion vector search for a first block included in an image; a search information calculation section for calculating search information by using the first motion vector; a second motion detection section for generating a second motion vector by performing a second motion vector search for a second block included in the image based on the search information, the first block being different from the second block, and the first motion vector search being different from the second motion vector search; and a motion vector selection section for selectively outputting either the first motion vector or the second motion vector. The number of candidates for the second motion vector in the second motion vector search is smaller than the number of candidates for the first motion vector in the first motion vector search.

30 Claims, 12 Drawing Sheets

FIG.3

| 1 | 2 | 1 | 2 | 1 | 2 | 1 | 2 | 1 | 2 |
|---|---|---|---|---|---|---|---|---|---|
| 2 | 1 | 2 | 1 | 2 | 1 | 2 | 1 | 2 | 1 |
| 1 | 2 | 1 | 2 | 1 | 2 | 1 | 2 | 1 | 2 |
| 2 | 1 | 2 | 1 | 2 | 1 | 2 | 1 | 2 | 1 |
| 1 | 2 | 1 | 2 | 1 | 2 | 1 | 2 | 1 | 2 |
| 2 | 1 | 2 | 1 | 2 | 1 | 2 | 1 | 2 | 1 |

FIG.4

| 1 | 31 | 2 | 32 | 3 | 33 | 4 | 34 | 5 | 35 |
|---|----|---|----|---|----|---|----|---|----|
| 36 | 6 | 37 | 7 | 38 | 8 | 39 | 9 | 40 | 10 |
| 11 | 41 | 12 | 42 | 13 | 43 | 14 | 44 | 15 | 45 |
| 46 | 16 | 47 | 17 | 48 | 18 | 49 | 19 | 50 | 20 |
| 21 | 51 | 22 | 52 | 23 | 53 | 24 | 54 | 25 | 55 |
| 56 | 26 | 57 | 27 | 58 | 28 | 59 | 29 | 60 | 30 |

FIG.5

|   |   |   |
|---|---|---|
| 2 | 1 A | 2 |
| 1 B | 2 X | 1 C |
| 2 | 1 D | 2 |

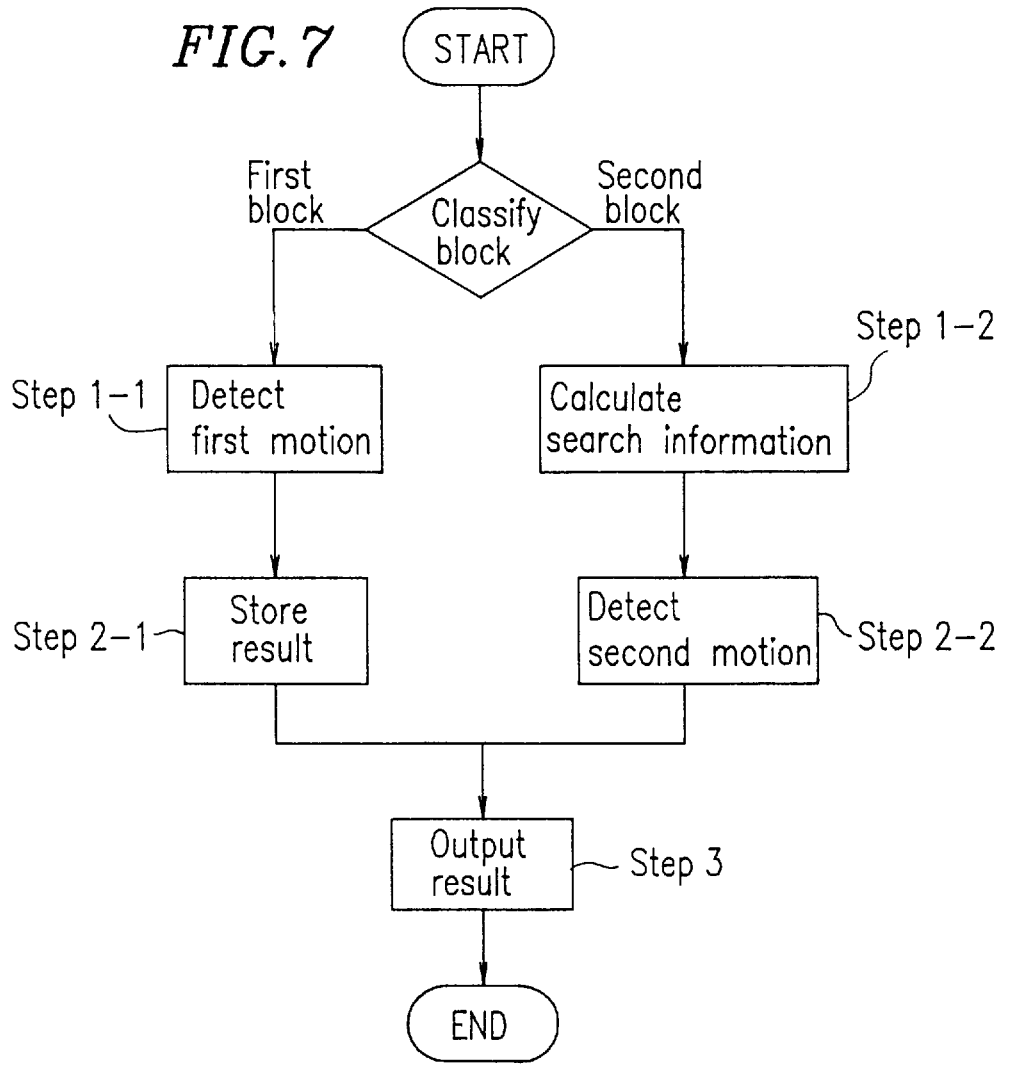

FIG.8A

| 1 | 2 | 1 | 2 | 1 | 2 | 1 | 2 | 1 | 2 |
|---|---|---|---|---|---|---|---|---|---|
| 1 | 2 | 1 | 2 | 1 | 2 | 1 | 2 | 1 | 2 |
| 1 | 2 | 1 | 2 | 1 | 2 | 1 | 2 | 1 | 2 |
| 1 | 2 | 1 | 2 | 1 | 2 | 1 | 2 | 1 | 2 |
| 1 | 2 | 1 | 2 | 1 | 2 | 1 | 2 | 1 | 2 |
| 1 | 2 | 1 | 2 | 1 | 2 | 1 | 2 | 1 | 2 |

FIG.8B

| 1 | 2 | 2 | 1 | 2 | 2 | 1 | 2 | 2 | 1 |
|---|---|---|---|---|---|---|---|---|---|
| 2 | 2 | 2 | 2 | 2 | 2 | 2 | 2 | 2 | 2 |
| 1 | 2 | 2 | 1 | 2 | 2 | 1 | 2 | 2 | 1 |
| 1 | 2 | 2 | 1 | 2 | 2 | 1 | 2 | 2 | 1 |
| 2 | 2 | 2 | 2 | 2 | 2 | 2 | 2 | 2 | 2 |
| 1 | 2 | 2 | 1 | 2 | 2 | 1 | 2 | 2 | 1 |

| 1 | 11 | 2 | 12 | 3 | 13 | 4 | 14 | 5 | 15 |
|---|----|---|----|---|----|---|----|---|----|
| 21 | 6 | 22 | 7 | 23 | 8 | 24 | 9 | 25 | 10 |
| 16 | 31 | 17 | 32 | 18 | 33 | 19 | 34 | 20 | 35 |
| 41 | 26 | 42 | 27 | 43 | 28 | 44 | 29 | 45 | 30 |
| 36 | 51 | 37 | 52 | 38 | 53 | 39 | 54 | 40 | 55 |
| 56 | 46 | 57 | 47 | 58 | 48 | 59 | 49 | 60 | 50 |

FIG.12

| 1 | 2 | 3 | 2 | 1 | 2 | 3 | 2 | 1 | 2 |
|---|---|---|---|---|---|---|---|---|---|
| 2 | 3 | 2 | 3 | 2 | 3 | 2 | 3 | 2 | 3 |
| 3 | 2 | 1 | 2 | 3 | 2 | 1 | 2 | 3 | 2 |
| 2 | 3 | 2 | 3 | 2 | 3 | 2 | 3 | 2 | 3 |
| 1 | 2 | 3 | 2 | 1 | 2 | 3 | 2 | 1 | 2 |
| 2 | 3 | 2 | 3 | 2 | 3 | 2 | 3 | 2 | 3 |

FIG. 13
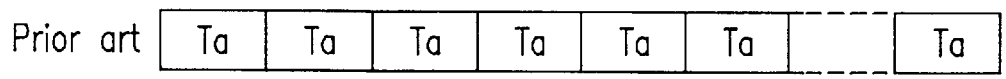
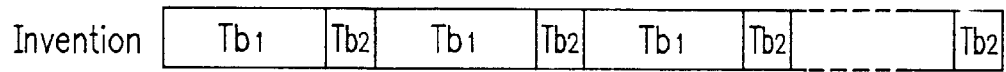
FIG. 14
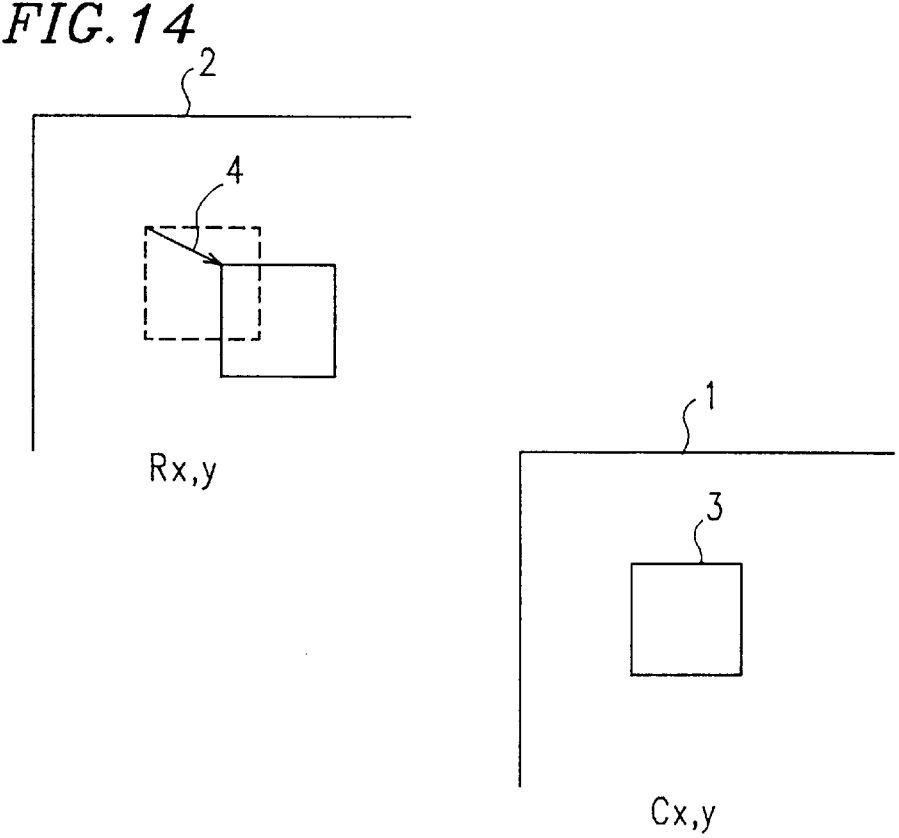

IMAGE MOTION DETECTION DEVICE

BACKGROUND OF THE INVENTION

1. Field of the Invention

The present invention relates to a moving image compression technique, and in particular to an image motion detection device for detecting the motions of an image which derives a motion vector for each of a plurality of blocks included in the image.

2. Description of the Related Art

In the field of moving image compression technology, a block matching method is widely used, according to which an image is divided into blocks each consisting of N×N pixels and a motion vector is derived for each block.

FIG. 14 illustrates the concept of the block matching method. Specifically, FIG. 14 describes an operation in which a current image 1 is divided into blocks 3, and a region having a similarity to each block 3 is searched for in a reference image 2. The motion vector for each block 3 is obtained by using pixel values $C_{x,y}$ of the current image and the pixel values $R_{x,y}$ of the reference image to derive a prediction error E(p,q) for each candidate motion vector (p,q) in accordance with eq.1, and selecting as a motion vector 4 the candidate motion vector (p,q) that has the minimum prediction error E(p,q). Hereinafter, this operation will be referred to as a "motion vector search". It is assumed that a motion vector search is conducted under the conditions $|p|, |q| \leq L$. Herein, L is an integer.

$$\Sigma(p,q) = \Sigma_{x'=1}^{N} \Sigma_{y'=1}^{N} |C_{x,y} - R_{x+p, y+q}|$$

When compressing a moving image, in general, the quality of the image obtained by decompressing a compressed image improves as the prediction error of the motion vector decreases. Therefore, an exhaustive search method, which searches all the candidate motion vectors in a given area, is the most advantageous in terms of the quality of the reconstructed image.

FIG. 15 illustrates a motion vector search by the exhaustive search method in the case where L=7. As seen from FIG. 15, the search is directed to all of the points (p, q) in the area, that is, all of the points (p, q) in the area are used as candidate motion vectors. In this example, the number of candidate motion vectors per block is 225, indicative of a large amount of computation to be performed for the calculation of prediction errors.

Therefore, various algorithms of motion vector searching have been proposed for reducing the computation amount required for the detection of motion vectors by limiting the number of candidate motion vectors. Among such methods, a "step search" method is particularly well-known.

FIG. 16 illustrates a motion vector search by a three-step search method in the case where L=7. The three-step search method is performed in the following procedure.

Step 1: Prediction errors are derived for 9 candidate motion vectors, i.e., an origin and 8 points which are away from the origin by ±4 pixels along the p direction and/or the q direction. A point corresponding to the one of the 9 candidate motion vectors that has the minimum prediction error is selected.

Step 2: Prediction errors are derived for 9 candidate motion vectors, i.e., the point selected in Step 1 and 8 points which are away from the point selected in Step 1 by ±2 pixels along the p direction and/or the q direction. A point corresponding to the one of the 9 candidate motion vectors that has the minimum prediction error is selected.

Step 3: Prediction errors are derived for 9 candidate motion vectors, i.e., the point selected in Step 2 and 8 points which are away from the point selected in Step 2 by ±1 pixel along the p direction and/or the q direction. A point corresponding to the one of the 9 candidate motion vectors that has the minimum prediction error is selected.

In this example, the number of candidate motion vectors per block is 25, which is 1/9 of the amount of computation required for the exhaustive search method.

A number of image motion detection devices in the prior art apply the same motion detection algorithm for each block. A method disclosed in Japanese Laid-Open Patent Publication No. 7-177519 applies a motion detection to some blocks while performing an interpolation for other blocks without applying any motion detection thereto.

FIG. 17 illustrates an example of "thinning out" blocks as disclosed in Japanese Laid-Open Patent Publication No. 7-177519. An image is divided into a plurality of blocks, which are classified into first blocks (shaded in FIG. 17) and second blocks. A motion detection is performed for any first block, but no motion detection is performed for any second block. Instead, the motion vector for the second block is obtained by interpolating the motion vectors for the blocks surrounding the second block.

Among the conventional motion vector search algorithms, the exhaustive search method is the most advantageous in terms of the quality of the reconstructed image, but has the problem of requiring a large amount of computation.

The step search method can substantially reduce the computation amount as compared to the exhaustive search method. However, since it does not process enough candidate motion vectors, it is possible that a motion vector with a large prediction error may be selected, resulting in poor quality of the reconstructed image.

According to the method disclosed in Japanese Laid-Open Patent Publication No. 7-177519, the motion vector for the "thinned-out" block is obtained by interpolating motion vectors for the blocks surrounding the "thinned-out" blocks. Therefore, as in the case of the step search method, the method in Publication No. 7-177519 can substantially reduce the computation amount as compared to the exhaustive search method, but may select a motion vector with a large prediction error, resulting in poor quality of the reconstructed image.

SUMMARY OF THE INVENTION

An image motion detection device according to the present invention includes: a first motion detection section for generating a first motion vector by performing a first motion vector search for a first block included in an image; a search information calculation section for calculating search information by using the first motion vector; a second motion detection section for generating a second motion vector by performing a second motion vector search for a second block included in the image based on the search information, the first block being different from the second block, and the first motion vector search being different from the second motion vector search; and a motion vector selection section for selectively outputting either the first motion vector or the second motion vector. The number of candidates for the second motion vector in the second motion vector search is smaller than the number of candidates for the first motion vector in the first motion vector search.

In one embodiment of the invention, the search information calculation section outputs one motion vector as the search information, and the second motion detection section performs the second motion vector search by exclusively utilizing points located in the vicinity of the one motion vector as the candidates for the second motion vector.

In another embodiment of the invention, the search information calculation section outputs a plurality of motion vectors as the search information, and the second motion detection section performs the second motion vector search by exclusively utilizing points located in the vicinity of the plurality of motion vectors as the candidates for the second motion vector.

Alternatively, the image motion detection device according to the present invention includes: a first motion detection section for generating a first motion vector by performing a first motion vector search for a group of blocks included in an image; a search information calculation section for calculating search information by using the first motion vector; a second through $n^{th}$ motion detection section for generating one of a second motion vector through an $n^{th}$ motion vector by performing one of a second motion vector search through an $n^{th}$ motion vector search for blocks other than the group of blocks based on the search information, the second through $n^{th}$ motion vector searches being respectively different from the first motion vector search; and a motion vector selection section for selectively outputting one of the first through $n^{th}$ motion vectors. The number of candidates for each of the second through $n^{th}$ motion vectors in the second through $n^{th}$ motion vector searches is smaller than the number of candidates for the first motion vector in the first motion vector search.

In one embodiment of the invention, the search information calculation section outputs one motion vector as the search information, and the second through $n^{th}$ motion detection section performs the second through $n^{th}$ motion vector searches by exclusively utilizing points located in the vicinity of the one motion vector as the candidates for the second through $n^{th}$ motion vectors.

In another embodiment of the invention, the search information calculation section outputs a plurality of motion vectors as the search information, and the second through $n^{th}$ motion detection section performs the second through $n^{th}$ motion vector searches by exclusively utilizing points located in the vicinity of the plurality of motion vectors as the candidates for the second through $n^{th}$ motion vectors.

Thus, the invention described herein makes possible the advantage of providing a method for obtaining a motion vector having the minimum prediction error with only a small amount of computation and improving the quality of the reconstructed image.

This and other advantages of the present invention will become apparent to those skilled in the art upon reading and understanding the following detailed description with reference to the accompanying figures.

BRIEF DESCRIPTION OF THE DRAWINGS

FIG. 3 illustrates a method for classifying a plurality of blocks included in image data 21 into two groups.

FIG. 4 shows an exemplary order in which a plurality of blocks included in the image data 21 are input to the image motion detection device 10.

FIG. 5 is an enlarged view showing some of the blocks shown in FIG. 3.

FIG. 7 is a flowchart illustrating an operation of the image motion detection device 10.

FIG. 8A illustrates another method for classifying a plurality of blocks included in image data 21 into two groups.

FIG. 8B illustrates still another method for classifying a plurality of blocks included in image data 21 into two groups.

FIG. 12 illustrates a method for classifying a plurality of blocks included in image data 21 into three groups.

FIG. 13 is a schematic diagram showing a comparison between the computation amounts required by the image motion detection device 10 of the present invention and a conventional image motion detection device.

FIG. 14 illustrates the concept of the block matching method.

DESCRIPTION OF THE EMBODIMENTS (Example 1)

Figure 1:
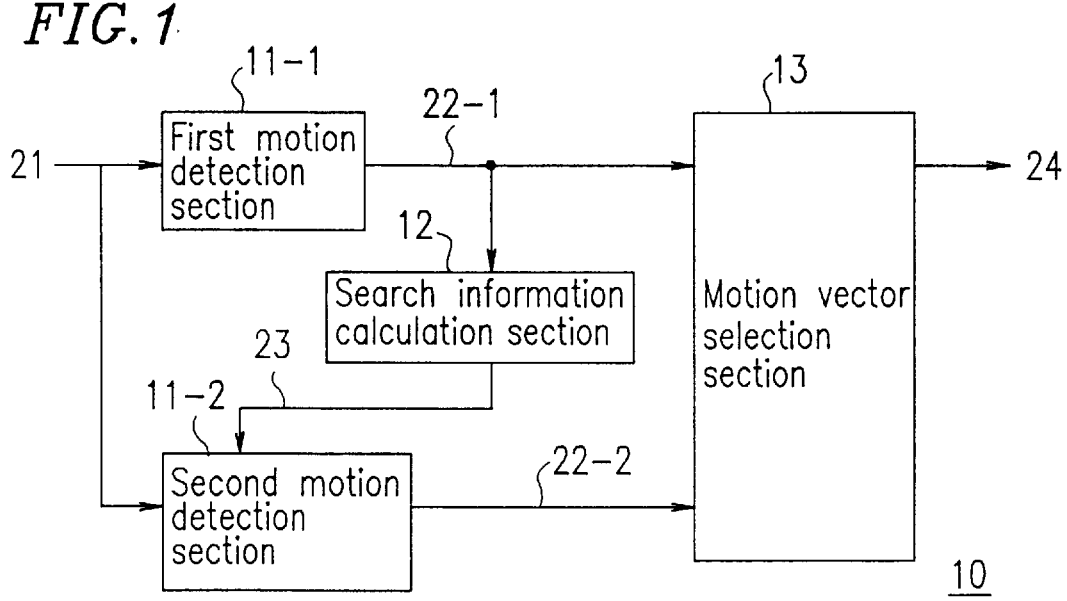
FIG. 1 shows the construction of an image motion detection device 10 according to the present invention.

FIG. 1 shows the construction of an image motion detection device 10 for detecting the motions of an image according to the present invention. The image motion detection device 10 receives image data 21, performs a motion vector search for each block included in the image data 21, and outputs a motion vector 24 corresponding to each block. The image motion detection device 10 applies a high-precision motion detection algorithm to some of the blocks included in the image data 21, and applies a low-precision motion detection algorithm to some or all of the remaining blocks in the image data 21.

As shown in FIG. 1, the image motion detection device 10 includes a first motion detection section 11-1, a second motion detection section 11-2, a search information calculation section 12, and a motion vector selection section 13.

Figure 2:
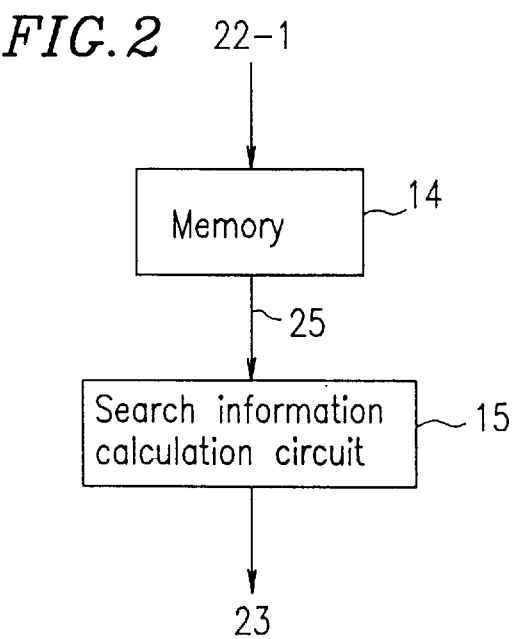
FIG. 2 shows the internal construction of a search information calculation section 12.

FIG. 2 shows the construction of the search information calculation section 12. The search information calculation section 12 includes a memory 14 and a search information calculation circuit 15.

The image data 21 is input to the image motion detection device 10. The image data 21 is divided into a plurality of blocks. Typically, each block consists of N×N pixels. The blocks are classified into a plurality of groups.

FIG. 3 illustrates a method for classifying blocks into two groups. In FIG. 3, numerals (1 or 2) indicate the different attributes of blocks. In the exemplary case shown in FIG. 3, the blocks are classified into two groups of blocks having different attributes: a group consisting of blocks (hereinafter referred to as "the first blocks") having the attribute indicated as "1"; and another group consisting of blocks (hereinafter referred to as "the second blocks") having the attribute indicated as "2".

The order in which the blocks included in the image data 21 are input to the image motion detection device 10 is predetermined.

FIG. 4 shows an exemplary order in which the blocks are input to the image motion detection device 10. The numerals in FIG. 4 denote the order of inputting blocks to the image motion detection device 10. For example, the block indicated as "1" is the first block that is input to the image motion detection device 10, and the block indicated as "30" is the 30th block that is input to the image motion detection device 10. As a result, in the exemplary case shown in FIG. 4, the first blocks are sequentially input to the image motion detection device 10 from the top left block to the bottom right block in the image, and thereafter the second blocks are sequentially input to the image motion detection device 10 from the top left block to the bottom right block in the image.

Referring back to FIG. 1, the operation of the image motion detection device 10 will be described.

The first blocks and the second blocks included in the image data 21 are input to the first motion detection section 11-1 and the second motion detection section 11-2.

Figure 15:
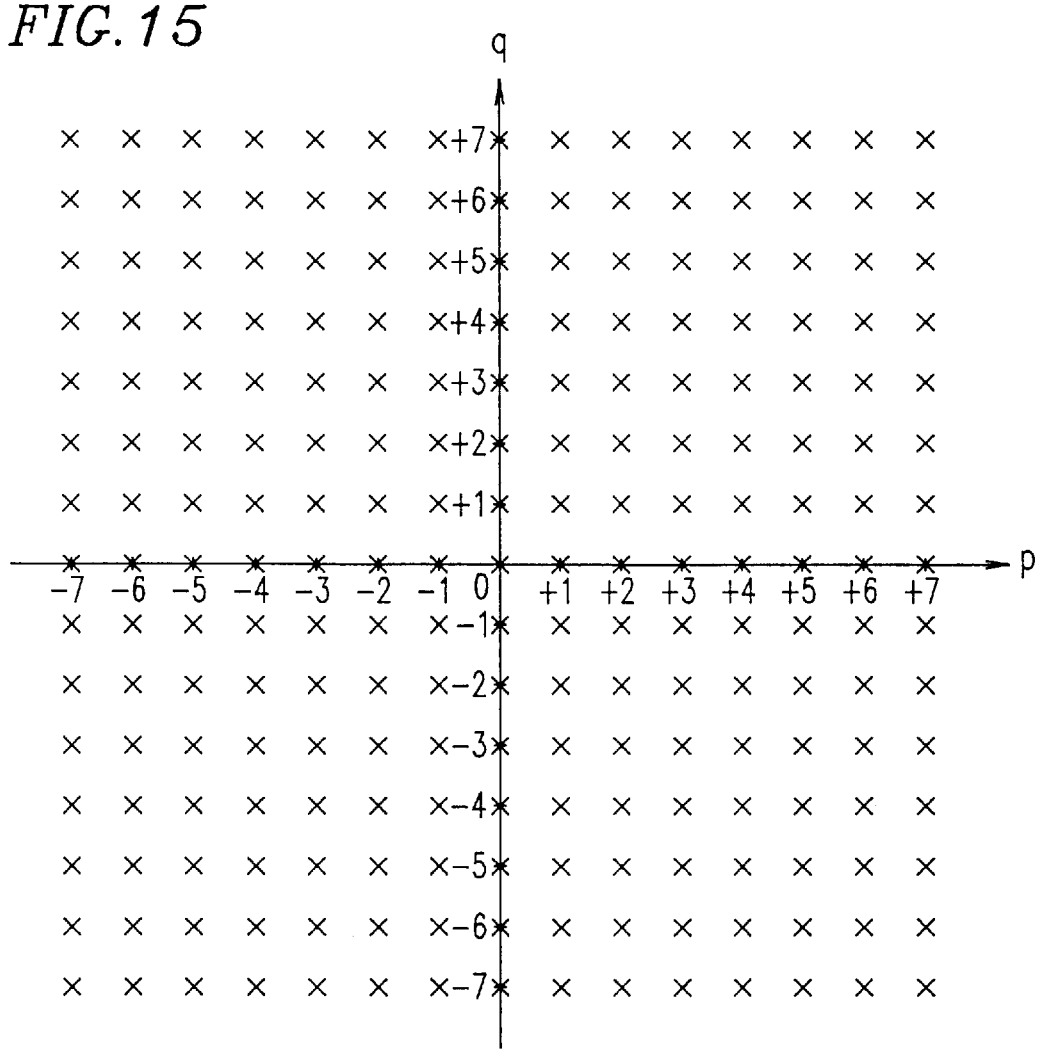
FIG. 15 illustrates a motion vector search by the exhaustive search method.
Figure 16:
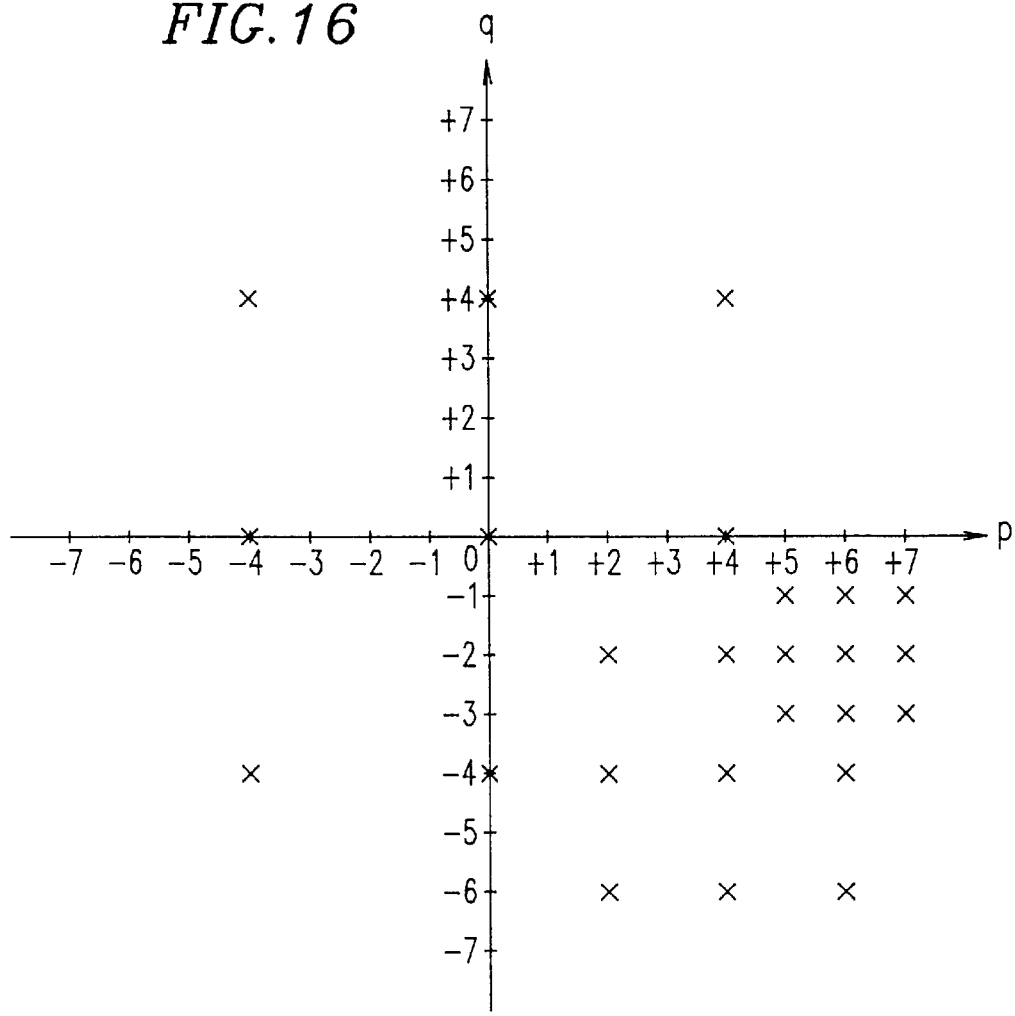
FIG. 16 illustrates a motion vector search by the three-step search method.
Figure 17:
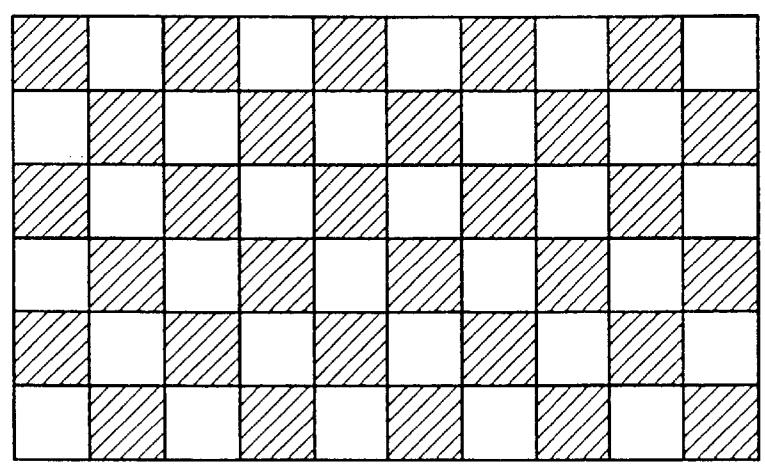
FIG. 17 illustrates an example of "thinning out" blocks by a conventional image motion detection device.

The first motion detection section 11-1 performs a predetermined motion vector search for a first block to generate a first motion vector 22-1. The motion vector search performed by the first motion detection section 11-1 utilizes relatively many candidate motion vectors. For example, the first motion detection section 11-1 performs a motion vector search according to the exhaustive search method (FIG. 15). As a result, motion vectors with relatively small prediction errors are obtained for the first blocks.

The first motion vector 22-1 is stored in the memory 14 in the search information calculation section 12 (FIG. 1). The first motion vector 22-1 stored in the memory 14 is used for generating candidates for a second motion vector 22-2, which is output from the second motion detection section 11-2. The search information calculation circuit 15 (FIG. 2) reads at least one first motion vector 25 from the memory 14 that corresponds to at least one first block located around a second block. Based on the at least one first motion vector 25 read from the memory 14, the search information calculation circuit 15 calculates a motion vector, which is output as search information 23.

Figure 5:
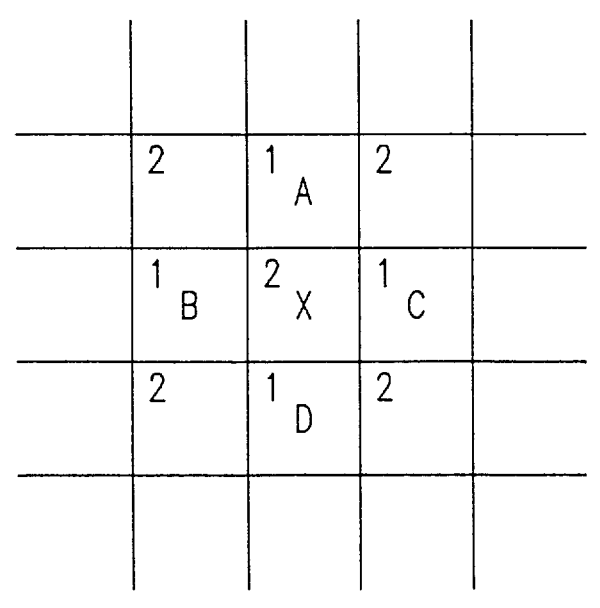

An exemplary calculation for obtaining the search information 23 to be performed by the search information calculation circuit 15 is described with reference to FIG. 5. FIG. 5 is an enlarged view showing a portion of the image data shown in FIG. 3. In FIG. 5, each square represents a block. The numeral indicated in the top left corner of each block represents the attribute of the block.

The search information calculation circuit 15 calculates the search information 23 for a second block X in accordance with eq. 2 below.

$$(p_x, q_x) = ((p_A + p_B + p_C + p_D)/4, (q_A + q_B + q_C + q_D)/4) \quad \text{eq. 2}$$

Herein, $(p_A, q_A)$, $(p_B, q_B)$, $(p_C, q_C)$, and $(p_D, q_D)$ represent motion vectors corresponding to first blocks A, B, C, and D, respectively, which are located around the second block X.

The second motion detection section 11-2 performs a predetermined motion vector search for a second block based on the search information 23 to generate the second motion vector 22-2.

Figure 6:
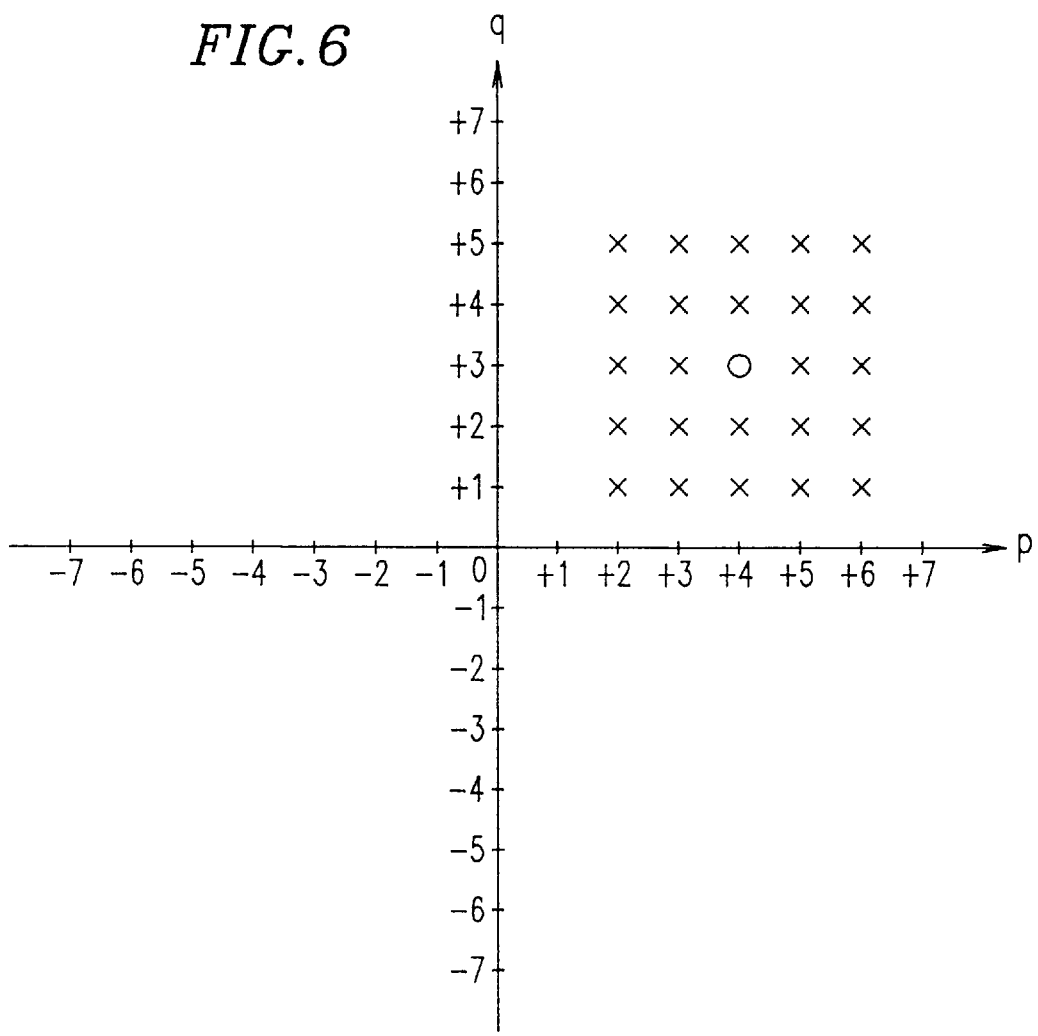
FIG. 6 illustrates a motion vector search performed by a second motion detection section 11-2.

Now, the motion vector search performed by the second motion detection section 11-2 based on the search information 23 is described with reference to FIG. 6. The "○" symbol in FIG. 6 represents a point corresponding to the search information 23 $(p_x, q_x)$ on the p-q plane. The second motion detection section 11-2 searches for a motion vector only among points located in the vicinity of the point corresponding to the search information 23 $(p_x, q_x)$ as candidate motion vectors. In the exemplary case shown in FIG. 6, the "vicinity of the point corresponding to the search information 23 $(p_x, q_x)$" refers to a point corresponding to the search information 23 $(p_x, q_x)$ and 24 points located around the point. The "x" symbols in FIG. 6 indicate locations of the 24 points.

Thus, the second motion detection section 11-2 performs a motion vector search for each second block with respect to a limited number of candidate motion vectors. The number of candidate motion vectors in the motion vector search by the second motion detection section 11-2 is smaller than the number of candidate motion vectors in the motion vector search by the first motion detection section 11-1. Thus, the computation amount performed by the second motion detection section 11-2 is substantially reduced.

The motion vector selection section 13 selectively outputs either the first motion vector 22-1 output from the first motion detection section 11-1 or the second motion vector 22-2 output from the second motion detection section 11-2. When a first block is input to the first motion detection section 11-1, a first motion vector 22-1 corresponding to the first block is output from the motion vector selection section 13. When a second block is input to the second motion detection section 11-2, a second motion vector 22-2 corresponding to the second block is output from the motion vector selection section 13.

FIG. 7 is a flowchart showing the above-mentioned operation of the image motion detection device 10. Through the respective steps shown in FIG. 7, each block included in the image data 21 is processed, whereby the motion vector 24 is generated.

Example 1 of the present invention has been described above. However, the image motion detection device according to the present invention is not limited to the particular embodiment described above, but accommodates various other embodiments.

The method for classifying the plurality of blocks included in the image data 21 is not limited to the method shown in FIG. 3. Instead of the method shown in FIG. 3, the classification methods shown in FIGS. 8A or 8B can be adopted, for example. In FIGS. 8A and 8B, numerals (1 or 2) indicate the respectively different attributes of blocks. In the exemplary case shown in FIGS. 8A and 8B, the blocks are classified into two groups of blocks having respectively different attributes.

In the case where the classification method shown in FIG. 8A is adopted, the search information calculation circuit 15 obtains the search information 23 by, for example, averaging the motion vectors corresponding to any two first blocks located on both sides of a second block.

In the case where the classification method shown in FIG. 8B is adopted, the search information calculation circuit 15 obtains the motion vector corresponding to any first block located on one side of a second block as the search information 23, for example. Alternatively, the search information calculation circuit 15 can obtain the search information 23 by, for example, averaging the motion vectors corresponding to any two first blocks located on the sides of a second block. Alternatively, the search information calculation circuit 15 can obtain the search information 23 by, for example, averaging the motion vectors corresponding to any four first blocks located around a second block.

The specific method regarding which first blocks in the vicinity of a given second block are used for obtaining the search information 23 is determined while considering the characteristics of the image to be processed and the like.

Moreover, the order in which the blocks included in the image data 21 are input to the image motion detection device 10 is not limited to the order shown in FIG. 4. Instead of the order shown in FIG. 4, an order shown in FIG. 9 can be adopted, for example. The numerals in FIG. 9 denote the order of inputting blocks to the image motion detection device 10.

Furthermore, the number of motion vectors which the search information calculation circuit 15 outputs as the search information 23 is not limited to one. It is possible to output a plurality of motion vectors as search information. For example, the search information calculation circuit 15 calculates two pieces of search information 23 ($p_{x1}$, $q_{x1}$) and ($p_{x2}$, $q_{x2}$) in accordance with eq.3 below.

$$(p_{x1}, q_{x1}) = (\min(p_A, p_B, p_C, p_D), \min(q_A, q_B, q_C, q_D)) \; (p_{x2}, q_{x2}) = (\max(p_A, p_B, p_C, p_D), \max(q_A, q_B, q_C, q_D)) \qquad \text{eq. 3}$$

Herein, ($p_A$, $q_A$), ($p_B$, $q_B$), ($p_C$, $q_C$), and ($p_D$, $q_D$) represent motion vectors corresponding to first blocks A, B, C, and D, respectively, which are located around the second block X.

Furthermore, the algorithm of motion vector search performed by the first motion detection section 11-1 is not limited to the exhaustive search method shown in FIG. 15, and the algorithm of motion vector search performed by the second motion detection section 11-2 is not limited to the search method shown in FIG. 6. Motion vector search methods of any algorithm can be adopted that satisfy the condition that the number of candidate motion vectors in the motion vector search by the second motion detection section 11-2 is smaller than the number of candidate motion vectors in the motion vector search by the first motion detection section 11-1.

Figures 9, 10:
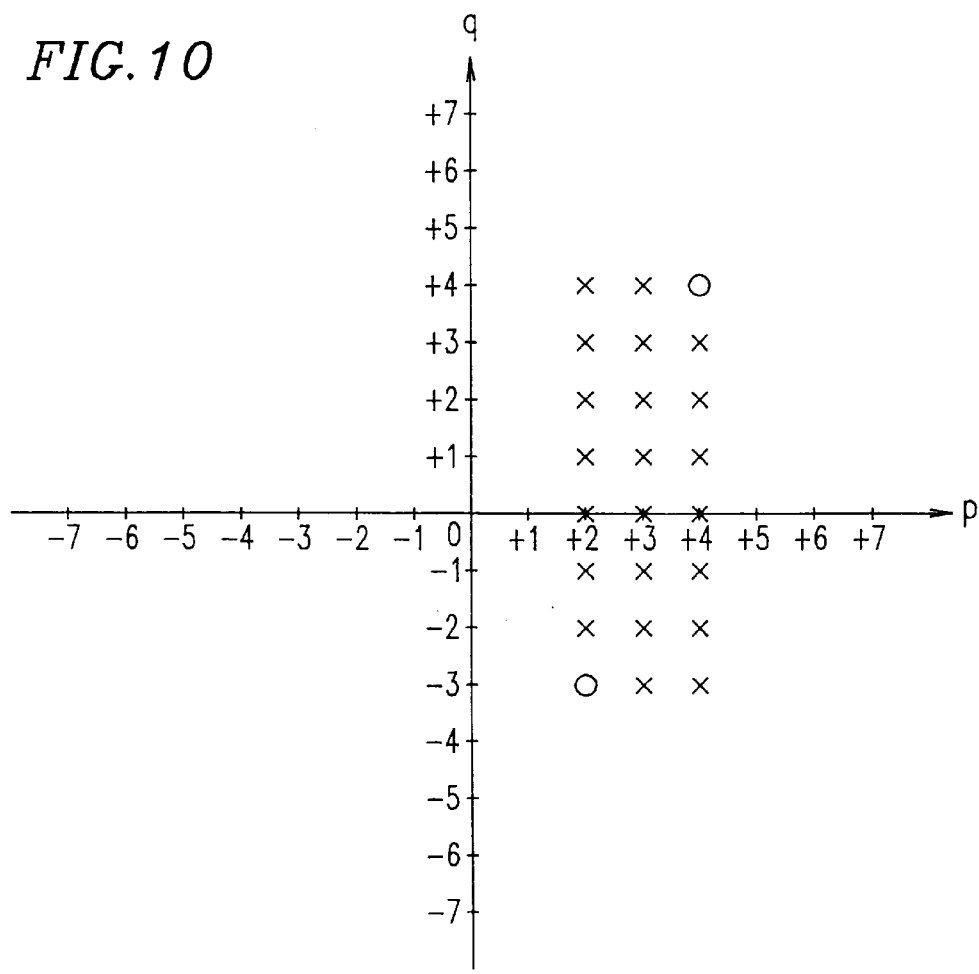
FIG. 9 shows an exemplary order in which a plurality of blocks included in the image data 21 are input to the image motion detection device 10.
FIG. 10 illustrates another motion vector search performed by the second motion detection section 11-2.

For example, in the case where the search information calculation circuit 15 provides two motion vectors as the search information 23, a search algorithm shown in FIG. 10 can be adopted. The "○" symbols in FIG. 10 represent points corresponding to the search information 23 ($p_{x1}$, $q_{x1}$) and ($p_{x2}$, $q_{x2}$) on the p-q plane. The second motion detection section 11-2 searches for a motion vector only among points located in the vicinity of the points corresponding to the search information 23 ($p_{x1}$, $q_{x1}$) and ($p_{x2}$, $q_{x2}$) as candidate motion vectors. In the exemplary case shown in FIG. 10, the "vicinity of the point corresponding to the search information 23 ($p_{x1}$, $q_{x1}$) and ($p_{x2}$, $q_{x2}$)" refers to 24 points located within a rectangular area having diagonal corners at the motion vectors ($p_{x1}$, $q_{x1}$) and ($p_{x2}$, $q_{x2}$). The "x" symbols in FIG. 10 indicate locations of those points among the 24 points which are other than the points corresponding to two motion vectors ($p_{x1}$, $q_{x1}$) and ($p_{x2}$, $q_{x2}$).

Thus, the second motion detection section 11-2 performs a motion vector search for each second block with respect to a limited number of candidate motion vectors. The number of candidate motion vectors in the motion vector search by the second motion detection section 11-2 is smaller than the number of candidate motion vectors in the motion vector search by the first motion detection section 11-1. Thus, the computation amount performed by the second motion detection section 11-2 is substantially reduced.

(Example 2)

Figure 11:
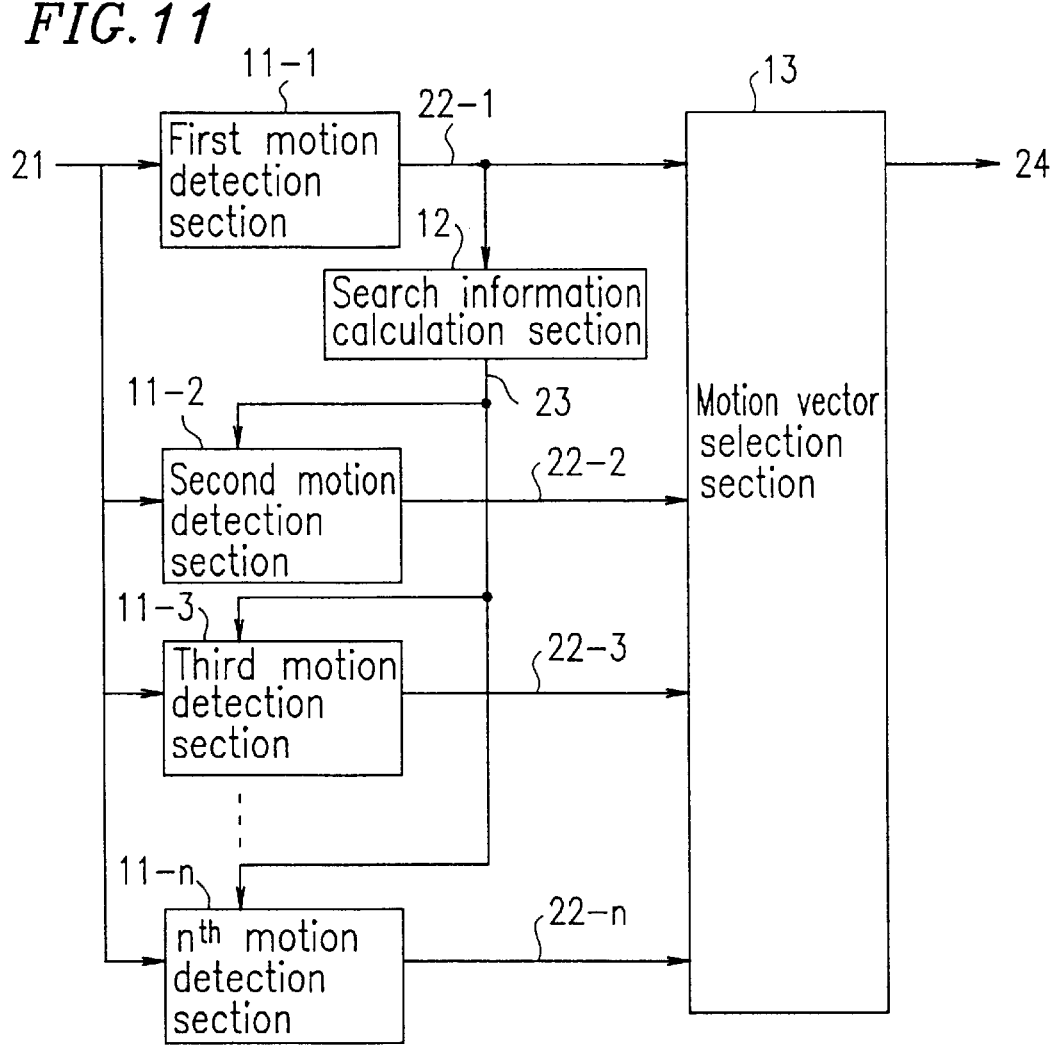
FIG. 11 shows the construction of an image motion detection device 20 according to the present invention.

FIG. 11 shows the construction of an image motion detection device 20 for detecting the motion of an image according to the present invention. The image motion detection device 20 receives image data 21, performs a motion vector search for each block included in the image data 21, and outputs a motion vector 24 corresponding to each block.

The image motion detection device 20 applies a high-precision motion detection algorithm to some of the blocks included in the image data 21, and applies a low-precision motion detection algorithm to the some or all of the remaining blocks in the image data 21.

As shown in FIG. 11, the image motion detection device 20 includes a first motion detection section 11-1, a second motion detection section 11-2, . . . , and an $n^{th}$ motion detection section 11-n, a search information calculation section 12, and a motion vector selection section 13. In FIG. 11, component elements which also appear in FIG. 1 are indicated by the same reference as those used therein.

FIG. 12 illustrates a method for classifying blocks into three groups. In FIG. 12, numerals (1, 2, or 3) indicate the respectively different attributes of blocks. In the exemplary case shown in FIG. 12, the blocks are classified into three groups of blocks having respectively different attributes. Similarly, it is possible to classify a plurality of blocks included in the image data into a number n of groups depending on the attributes of blocks. Herein, a block having an "i" attribute will be referred to as an "$i^{th}$" block, where i=1, 2, 3, 4, . . . , n.

Hereinafter, the operation of the image motion detection device 20 will be described.

The plurality of blocks included in the image data 21 are input to the first motion detection section 11-1 through the $n^{th}$ motion detection section 11-n.

The first motion detection section 11-1 performs a predetermined motion vector search for a first block to generate a first motion vector 22-1. The motion vector search performed by the first motion detection section 11-1 utilizes relatively many candidate motion vectors. For example, the first motion detection section 11-1 performs a motion vector search according to the exhaustive search method (FIG. 15). As a result, motion vectors with relatively small prediction errors are obtained for the first blocks.

The first motion vector 22-1 is stored in the memory 14 in the search information calculation section 12 (FIG. 2). The first motion vector 22-1 stored in the memory 14 is used for generating candidates of a second motion vector 22-2 through an $n^{th}$ motion vector 22-n. The search information calculation circuit 15 (FIG. 2) reads at least one first motion vector 25 from the memory 14 that corresponds to at least one first block located around an $i^{th}$ block (where i=2, 3, 4, . . . , n). Based on the at least one first motion vector 25 read from the memory 14, the search information calculation circuit 15 calculates a motion vector, which is output as search information 23.

The $i^{th}$ motion detection section 11-i performs a predetermined motion vector search for the $i^{th}$ block based on the search information 23 to generate the $i^{th}$ motion vector 22-i. The motion vector search by the $i^{th}$ motion detection section 11-i is similar to the motion vector search by the second motion detection section 11-2 described in Example 1. That is, the $i^{th}$ motion detection section 11-i performs a motion vector search for each $i^{th}$ block with respect to a limited number of candidate motion vectors. The number of candidate motion vectors in the motion vector search by the $i^{th}$ motion detection section 11-i is smaller than the number of candidate motion vectors in the motion vector search by the first motion detection section 11-1. Thus, the computation amount performed by the $i^{th}$ motion detection section 11-i is substantially reduced. Herein, i=2, 3, 4, . . . , n.

The second through $n^{th}$ motion detection sections 11-2 to 11-n perform respectively different motion vector searches. For example, in the case where a plurality of blocks are classified as shown in FIG. 12, the second motion detection section 11-2 and the third motion detection section 11-3 are configured so that the number of candidate motion vectors in the motion vector search by the second motion detection section 11-2 is smaller than the number of candidate motion vectors in the motion vector search by the third motion detection section 11-3. In the exemplary case shown in FIG. 12, each second block is closer than a corresponding third block to a corresponding first block, so that the motion vector search for the second block can be performed with respect to a relatively limited number of candidate motion vectors. Thus, the computation amount performed by the second motion detection section 11-2 can be further reduced.

The motion vector selection section 13 selectively outputs one of the first motion vector 22-1 through the $n^{th}$ motion vector 22-n.

It will be appreciated that the various embodiments described for the image motion detection device 10 are also applicable to the image motion detection device 20.

In the above description, the first and second motion detection sections and the first to $n^{th}$ motion detection sections were described as independent functional portions for the sake of clarity. However, most of such functional portions can be implemented as common circuitry. Therefore, the circuitry of the image motion detection device of the present invention is not substantially increased as compared to a conventional image motion detection device composed only of the first motion detection section as defined herein.

According to the present invention, one type of motion vector search is performed for one group of blocks while another type of motion vector search is performed for the other group of blocks. The number of candidate motion vectors in the motion vector search for the other group of blocks is smaller than the number of candidate motion vectors in the motion vector search for the one group of blocks. As a result, it is possible to obtain motion vectors with smaller prediction errors, with a relatively small amount of computation as compared with conventional image motion detection devices. Moreover, the quality of the reconstructed image is improved.

Specifically, the image motion detection device of the present invention can provide motion vectors with smaller prediction errors than those provided by the step search method or the method disclosed in Japanese Laid-Open Patent Publication No. 7-177519, with a smaller amount of computation than in the case of the exhaustive search method, while improving the quality of the reconstructed image.

FIG. 13 is a schematic diagram showing a comparison between the computation amounts for respective blocks with respect to the image motion device 10 of the present invention and a conventional image motion detection device. While the conventional image motion detection device has a constant process time $T_a$ for all the blocks, the image motion detection device 20 of the invention has a first process time $T_{b1}$ for first blocks and a second process time $T_{b2}$ for second blocks. Assuming that both the image motion detection device 10 and the conventional image motion detection device require the same amount of computation for the motion detection of one entire image, eq.4 holds.

$$T_{b2} < T_a < T_{b1} \qquad \text{eq.4}$$

Thus, the first blocks are subjected to a motion vector search with a larger number of candidate motion vectors than in the case of the conventional image motion detection device. On the other hand, the second blocks are subjected to a motion vector search with a smaller number of candidate motion vectors than in the case of the conventional image motion detection device. However, since the motion vector search for the second blocks is based on the search information calculated through the high-precision motion vector search for the first blocks according to the present invention, the prediction errors which accompany the resultant motion vectors are not as great as indicated by the difference in process times. In other words, the magnitude of increase in the precision of motion vectors for the first blocks is larger than the magnitude of decrease in the precision of motion vectors for the second blocks, so that the motion vector precision as a whole improves.

The effects of the image motion detection according to the present invention are most outstanding in image compression devices whose design allows relatively small-scale circuitry for the motion detection, e.g., video phone system.

Various other modifications will be apparent to and can be readily made by those skilled in the art with out departing from the scope and spirit of this invention. Accordingly, it is not intended that the scope of the claims appended hereto be limited to the description as set forth herein, but rather that the claims be broadly construed.

What is claimed is:

1. An image motion detection device for detecting motion in an image divided into at least a first block having a first classified attribute and a second block having a second classified attribute different from the first classified attribute, comprising:

a first motion detection section for generating a first motion vector by performing a first motion vector search for the first block included in the image;

a search information calculation section for calculating search information by using the first motion vector;

a second motion detection section for generating a second motion vector by performing a second motion vector search for the second block included in the image based on the search information, and the first motion vector search being different from the second motion vector search; and a motion vector selection section for selectively outputting either the first motion vector or the second motion vector, wherein a second number of candidates for the second motion vector in the second motion vector search is smaller than a first number of candidates for the first motion vector in the first motion vector search.

2. The image motion detection device according to claim 1, wherein the search information calculation section outputs one motion vector as the search information, and the second motion detection section performs the second motion vector search by exclusively utilizing points located in the vicinity of the one motion vector as the candidates for the second motion vector.

3. The image motion detection device according to claim 2, wherein said search information calculation section includes means for averaging motion vectors in said first block adjacent to said second block.

4. The image motion detection device according to claim 1, wherein a first process time is associated with performing the first motion vector search and a second process time is associated with performing the second motion vector search, wherein the second performing the second motion vector search, wherein the second process time is less than the first process time since the second number of candidates is smaller than the first number of candidates, and wherein a sum of the first and second process times equals twice a constant process time for a thinned-out block motion vector search, thereby resulting in a total process time for motion detection of the image which is equal to a total process time for a thinned-out block motion detection while substantially reducing a prediction error associated with the thinned-out block motion detection.

5. The image motion detection device according to claim 4, wherein the first number of candidates and the second number of candidates are selected such that an increase in precision of motion vectors for the first block over precision obtained using constant number of candidates considered during the constant process time is greater than a decrease in precision of motion vector for the second block from precision obtained using the constant number of candidates.

6. The image motion detection device according to claim 1, wherein the first motion detection section generates at least one first motion vector by performing the first motion vector search for at least one first block which is located around the second block.

7. The image motion detection device according to claim 6, wherein the search information calculation section includes:
    a memory for storing the at least one first motion vector; and
    a search information calculation circuit for calculating a motion vector based on the at least one first motion vector which is stored in the memory and for outputting the motion vector as search information.

8. The image motion detection device according to claim 1, wherein the search information calculation section outputs a plurality of motion vectors as the search information, and the second motion detection section performs the second motion vector search by exclusively utilizing points located in the vicinity of the plurality of motion vectors as the candidates for the second motion vector.

9. The image motion detection device according to claim 8, wherein said search information calculation includes means for selecting a minimum motion vector and a maximum motion vector from motion vectors in said first block adjacent to said second block to serve as said plurality of motion vectors.

10. The image motion detection device according to claim 8, wherein said search information calculation section generates first motion vectors $(p_A, q_A)$, $(p_B,q_B)$, $(p_C,q_C)$ and $(p_D,q_D)$ by performing the first motion vector search for first blocks A, B, C and D which are located around the second block, and calculates a minimum motion vector $(p_1,q_1)$ and a maximum motion vector $(p_2,q_2)$ as the search information, where $(p_1,q_1)=(\min(p_A,p_B,p_C,p_D), \min(q_A, q_B,q_C,q_D))$ and $(p_2,q_2)=(\max(p_A, p_B, p_C, p_D),\max(q_A, q_B, q_C, q_D))$.

11. An image motion detection device for detecting motion in an image divided into n groups of blocks, each having classified attributes different from each other, comprising:
    a first motion detection section for generating a first motion vector by performing a first motion vector search for a group of blocks included in an image;
    a search information calculation section for calculating search information by using the first motion vector;
    second through $n^{th}$ motion detection sections for generating at least one of a second motion vector through an $n^{th}$ motion vector by performing one of a second motion vector search through an $n^{th}$ motion vector search for n groups of blocks other than the group of blocks upon which the search information is based, the second through $n^{th}$ motion vector searches being respectively different from the first motion vector search; and
    a motion vector selection section for selectively outputting at least one of the first through $n^{th}$ motion vectors, wherein a second through $n^{th}$ number of candidates for each of the second through $n^{th}$ motion vectors in the second through $n^{th}$ motion vector searches is smaller than a first number of candidates for the first motion vector in the first motion vector search.

12. The image motion detection device according to claim 11, wherein the search information calculation section outputs one motion vector as the search information, and the second through $n^{th}$ motion detection sections perform the second through $n^{th}$ motion vector searches by exclusively utilizing points located in the vicinity of the one motion vector as the candidates for the second through $n^{th}$ motion vectors.

13. The image motion detection device according to claim 12, wherein said search information calculation section includes means for averaging motion vectors in said first block adjacent to second through $n^{th}$ blocks.

14. The image motion detection device according to claim 4, wherein a first process time is associated with performing the first motion vector search and a second process time is associated with performing the second motion vector search, wherein the second process time is less than the first process time since the second number of candidates is smaller than the first number of candidates, and wherein a sum of the first and second process times equals twice a constant process time for a thinned-out block motion vector search, thereby resulting in a total process time for motion detection of the image which is equal to a total process time for a thinned-out block motion detection while substantially reducing a prediction error associated with the thinned-out block motion detection.

15. The image motion detection device according to claim 14, wherein the first number of candidates and the second number of candidates are selected such that an increase in precision of motion vectors for the first block over precision obtained using constant number of candidates considered during the constant process time is greater than a decrease in precision of motion vector for the second blocks from precision obtained using the constant number of candidates.

16. The image motion detection device according to claim 11, wherein the first motion detection section generates at least one first motion vector by performing the first motion vector search for the group of blocks which are located around blocks other than the group of blocks.

17. The image motion detection device according to claim 16, wherein the search information calculation section includes:
    a memory for storing the at least one first motion vector; and
    a search information calculation circuit for calculating a motion vector based on the at least one first motion vector which is stored in the memory and for outputting the motion vector as search information.

18. The image motion detection device according to claim 11, wherein the search information calculation section outputs a plurality of motion vectors as the search information, and the second through $n^{th}$ motion detection sections perform the second through $n^{th}$ motion vector searches by exclusively utilizing points located in the vicinity of the plurality of motion vectors as the candidates for the second through $n^{th}$ motion vectors.

19. The image motion detection device according to claim 18, wherein said search information calculation includes means for selecting a minimum motion vector and a maximum motion vector from motion vectors in said first block adjacent to second through n[th] blocks to serve as said plurality of motion vectors.

20. The image motion detection device according to claim 18, wherein said search information calculation section generates first motion vectors $(p_A,q_A)$, $(p_B,q_B)$, $(p_C,q_C)$ and $(p_D,q_D)$ by performing the first motion vector search for blocks A, B, C and D of the group of blocks which are located around blocks other than the group of blocks, and calculates a minimum motion vector $(p_1,q_1)$ and a maximum motion vector $(p_2,q_2)$ as the search information, where $(p_1,q_1)=(\min(p_A, p_B, p_C, p_D), \min(q_A,q_B,q_C,q_D))$ and $(p_2,q_2)=(\max(p_A, p_B, p_C, p_D), \max(q_A, q_B, q_C, q_D))$.

21. A method for detecting motion in an image, comprising the steps of:
    dividing the image into at least a first block having a first classified attribute and a second block having a second classified attribute different from the first classified attribute;
    generating a first motion vector by performing a first motion vector search for the first block;
    calculating search information using the first motion vector;
    selecting candidates to be considered during a second motion vector search for the second block in accordance with the search information; and
    generating a second motion vector by performing the second motion vector search for the second block using candidates output by said selecting step.

22. The method according to claim 21, wherein the search information is a motion vector and said selecting step includes exclusively utilizing candidates located in the vicinity of the motion vector as candidates for the second motion vector.

23. The method according to claim 21, wherein the search information is a plurality of motion vectors and said selecting step includes exclusively utilizing candidates located in the vicinity of the plurality of motion vector as candidates for the second motion vector.

24. The method for detecting motion in the image according to claim 21, wherein at least one first motion vector is generated by performing the first motion vector search for at least one first block which is located around the second block.

25. The method for detecting motion in the image according to claim 24 wherein the calculating step includes:
    storing the at least one first motion vector;
    calculating a motion vector based on the at least one first motion vector; and
    outputting the motion vector as search information.

26. A method for detecting motion in an image, comprising the steps of:
    dividing the image into n groups of blocks, each having classified attributes different from each other;
    generating a first motion vector by performing a first motion vector search for a group of blocks;
    calculating search information using the first motion vector;
    selecting candidates to be considered in each of a second through n[th] motion vector search in accordance with the search information; and
    generating at least one of a second through n[th] motion vector by performing at least one of the second motion vector search through the nth motion vector search for n groups of blocks other than the group of blocks upon which the search information is based, using candidates output by said selecting step.

27. The method according to claim 26, wherein the search information is a motion vector and said selecting step includes exclusively utilizing candidates located in the vicinity of the motion vector as candidates for the second through n[th] motion vectors.

28. The method according to claim 26, wherein the search information is a plurality of motion vectors and said selecting step includes exclusively utilizing candidates located in the vicinity of the plurality of motion vectors as candidates for the second through n[th] motion vectors.

29. The method for detecting motion in the image according to claim 26, wherein at least one first motion vector is generated by performing the first motion vector search for the group of blocks which are located around blocks other than the group of blocks.

30. The method for detecting motion in the image according to claim 29 wherein the calculating step includes:
    storing the at least one first motion vector;
    calculating a motion vector based on the at least one first motion vector; and
    outputting the motion vector as search information.

* * * * *